United States Patent [19]

Metcalf

[11] Patent Number: 4,867,311

[45] Date of Patent: Sep. 19, 1989

[54] COMPUTER DISKETTE DISPENSER AND STORAGE DEVICE

[76] Inventor: Darrell J. Metcalf, 520 First St., Fillmore, Calif. 93015

[21] Appl. No.: 274,015

[22] Filed: Nov. 21, 1988

[51] Int. Cl.⁴ .................... B65D 85/676; B65D 85/57
[52] U.S. Cl. .................................. 206/444; 206/387; 312/15
[58] Field of Search ............... 206/444, 309, 311, 387, 206/425; 220/334; 312/8–19

[56] References Cited

U.S. PATENT DOCUMENTS

| | | | |
|---|---|---|---|
| 4,640,415 | 2/1987 | Ackeret | 206/387 |
| 4,655,345 | 4/1987 | Drake et al. | 312/10 |
| 4,734,814 | 3/1988 | Fujino et al. | 206/444 |
| 4,760,502 | 7/1988 | Ackeret | 206/387 |

Primary Examiner—Joseph M. Moy

[57] ABSTRACT

An improved computer disk holder comprising a box-type container with one open side, or a side that can be opened, into which a plurality of labeled slots suitable for the insertion of computer disks or the like is provided and into each slot is positioned a spring-clip mechanism which may be independently activated in one configuration of said disk holder, by an external implement such as a pen, or in another configuration of said disk holder, by a lockable selector-button which will simultaneously point to an index, such as a numbered index, and dispense any correspondingly numbered disk when it is depressed, or dispense any sequence of numbered disks corresponding to that portion of the index which the selector-button slides over while being depressed at the same time.

11 Claims, 6 Drawing Sheets

COMPUTER DISKETTE DISPENSER AND STORAGE DEVICE

BACKGROUND

This invention relates to computer diskette storage and retrieval devices, and is particularly directed to means for quickly retrieving one or more stored disks or the like from such a device.

PRIOR ART

It has been said that one measure of intelligence is: "Our ability to obtain the information we need, when we need it." While the personal computer has provided us a convenient means for creating 'files' of information, these files, which are typically stored on computer disks, can easily become voluminous, requiring many disks to be used and properly stored. These same computers may also utilize disks for the loading of software programs, creating a combination of many types of disks and files. As anyone who uses computers can attest, finding the right disk when you need it can be very frustrating. This is especially true when there are many disks to be sorted through. Accordingly, any means for facilitating the retrieval of desired disks is greatly to be appreciated.

Numerous devices have been proposed heretofore for accomplishing this purpose. However, none of the prior art have been entirely satisfactory. Thus, it has been proposed to provide disk storage in box-type containers which require the user to physically sort through a series of disks by hand, until the desired disk is found. Another approach has been to 'stair-step' or stagger the height of each stored disk and/or color-code a number of smaller compartments within the disk storage device in order to improve one's visual reference to the disks being stored. Another method offers a process for mechanically scrolling sequentially through a series of disks by having one disk at a time 'pop' up approximately ½ of an inch. The usefulness of all of these approaches depends on whether or not you can actually see that portion of the disk label which tells you the information you really need, and how easy it is to see it. In many cases, such as the labels provided by software manufacturers, the necessary information printed on the disk label may not be positioned in such a way as to be easily seen. Another problem with many of these disk storage devices are the lids they employ for the containment of the stored disks. While these lids may provide some security with a variety of locking mechanisms, the amount of desk space required when they are opened or removed can be more than double the amount required for the closed container. This is also true of the accordion-type or expanable/collapsible disk holders or pouches. In addition, another disk storing method has been employed which indexes or catalogs disks by number, a numbered adhesive label is placed on the disk container, its numbers correspond to a sequence of numbered slots in the container itself. The title or other pertinent information or the disk label is entered next to a number on the adhesive label and that disk is slid into its respectively numbered slot in the disk container. Unfortunately with this approach, the desired disk has to be selected by grasping it by its edges. Due to the narrowness of the disks and their close proximity to one another, this procedure can be unnecessarily cumbersome. This type of storage device, while being more organized and compact than the ones already mentioned, offers no security feature—no provision for locking disks within the disk container. Consequently, with the prior art, the computer user has had to forfeit some, or all of the following: desktop space, some security, time in retrieving disks, organization or ease-of-handling. Thus none of the prior art disk storage and retrieval devices have been entirely satisfactory.

BRIEF SUMMARY AND OBJECTS OF INVENTION

These disadvantages of the prior art are overcome with the present invention and a compact, improved storage and retrieval means for computer disks is provided which permits any disk, or sequence of disks in the disk holder to be quickly selected an dispensed from the holder on demand, by simply pushing a button corresponding to a desired disk or sequence of disks. In addition, with the device of the present invention, a means for providing some security of the stored disks is also provided, to prohibit the dispensing of disks while the user is away.

The advantages of this present invention are preferably attained by providing an improved computer disk storage and retrieval device comprising a box-type container with one open side, or a side which can be opened, exposing multiple numbered slots into which an equal number of computer disks or the like may be easily inserted, indexed, temporarily stored locked in place or dispensed from said box by means of a corresponding number of locking-lever spring mechanisms, herein referred to as 'spring-clips'. The spring-clips can be employed as a separate spring and clip or combined into one working part as a spring-clip. A plurality of these spring-clips, whether separated or combined, can be manufactured as one composite unit of multiple spring-clips, to simplify the assembly process. A spring-clip is positioned in each numbered slot contained in said box in such a way as to be independently triggered by depressing that portion of the clip which will cause a spring-release action to occur dispensing a single disk on demand. An alternative to the independent triggering of each spring-clip is provided by means of a positionably slideable 'selector-button'. One portion of the selector-button slides just over the trigger mechanism of a spring-clip while another portion of the selector-button simultaneously points to an index indicating which spring-clip and/or disk is about to be activated. The selector-button can activate any of the spring-clips, one at a time, or any in sequence. A single spring-clip is activated by simply depressing the selector-button while it is in a stationary position, which causes a portion of the selector-button to sufficiently contact and trigger the spring-clip mechanism. Similarly, a sequence of spring-clips may be activated by depressing the selector-button and simultaneously sliding it over the desired sequence of spring-clips. Thus, and, or all of the disks, which are held in place by the spring-clips, may be dispensed in an instant by the selector-button. The selector-button can also be configured in such a way as to provide a means for the insertion of a locking device, such as a standard padlock, to prohibit the depression of the selector-button, which in turn prohibits the dispensing of disks while said locking device is in place.

Accordingly, it is an object of the present invention to provide improved means for storing and retrieving computer diskettes and the like.

Another object of the present invention is to provide improved means for dispensing one or more disks as needed from a disk holder by using a plurality of locking-lever spring mechanisms, herein referred to as 'spring-clips'.

An additional object of the present invention is to provide improved means for dispensing one or more disks as needed from a disk holder by using an external implement such as a pen, pencil, or finger to trigger the disk dispensing action of the spring-clips in any disk-slot of the disk holder.

Another object of the present invention is to provide improved means for dispensing one or more disks as needed from a disk holder by using a positionably slideable selector-button to trigger the disk dispensing action of the spring-clips in any disk-slot of the disk holder.

A further object of the present invention is to provide improved means for dispensing one or more disks as needed from a disk holder by using a positionably slideable selector-button which simultaneously points to an index, such as a number thereof, and then dispenses only a correspondingly indexed/numbered disk when the selector-button is depressed.

An additional object of the present invention is to provide improved means for dispensing multiple disks as needed from a disk holder by using a positionably slideable selector-button which simultaneously points to an index, such as the beginning of any sequence of numbers thereof, and then dispenses a sequence of disks corresponding to that portion of the index which the selector-button slides over while being depressed at the same time Another object of the present invention is to provide improved means for storing and securing computer diskettes and the like with a selector button that permits the insertion of a locking device, such as padlock, to prohibit the depression of the selector-button, which in turn prohibits the dispensing of disks while said locking device is in place.

A specific object cf the present invention is to provide an improved computer disk holder comprising a box-type container with one open side, or a side that can be opened, into which a plurality of labeled slots suitable for the insertion of computer disks or the like is provided and into each slot is positioned a spring-clip mechanism which may be independently activated in one configuration of said disk holder, by an external implement such as a pen, or in another configuration of said disk holder, by a lockable selector-button which will simultaneously point to an index, such as a numbered index, and dispense any correspondingly numbered disk when it is depressed, or dispense any sequence of numbered disks corresponding to that portion of the index which the selector-button slides over while being depressed at the same time.

These and other objects and features of the present invention will be apparent from the following detailed description, wherein reference is made to the figures of the accompanying drawings.

DETAILED DESCRIPTION OF THE INVENTION

Figure 1:
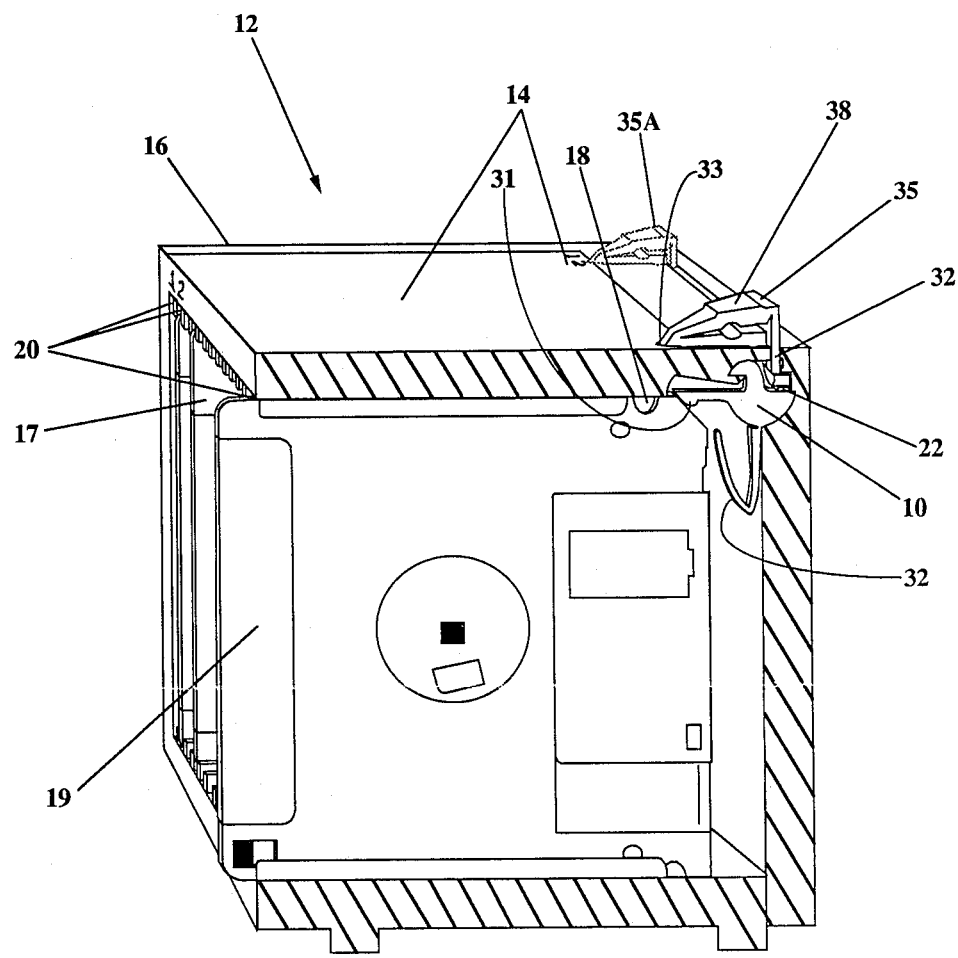
FIG. 1 is an isometric view and vertical section through a computer diskette dispenser according to a typical embodiment o the present invention.

In that form of the present invention chosen for purposes of illustration in FIG. 1, a computer diskette dispenser is indicated generally at 12, comprising a box-type container 16 configured in substantially any width, having one open side 17 or a side which can be opened, exposing multiple numbered slots 20 into which an equal number of computer disks 19 or the like may be easily inserted, secured and dispensed from said box 16 by means of a corresponding number of locking-levers with spring mechanisms herein referred to as 'spring-clips' 10. A spring-clip 10 (see FIGS. 4, 7, 8, 9, 10, 11, 12 & 13) is positioned in each numbered slot 20 contained in said box 16, in such a way as to be independently triggered by depressing the uppermost horizontal surface of the trigger portion of the spring-clip 22, thereby causing a spring-clip latch 31 to disengage the disk 19 from an indent in the disk 18, allowing a spring action 32 to dispense a disk. A means for triggering each spring-clip 10 is provided by a positionably slideable 'selector-button' 35 which is constructed out of a resilient material, such as plastic. As the selector-button 35 is positioned, an actuator-arm 32 of the selector-button 35 slides just over the spring-clip triggers 22, while another portion of the selector-button 33 simultaneously points to an index 14 indicating which spring-clip and/or disk is selected for activation when the button surface 38 of selector-button 35 is depressed. Alternatively, if desired, a sequence of spring-clips may be activated by the actuator-arm 32 of selector-button 35, when the button surface 38 of selector-button 35 is depressed while simultaneously sliding it 35A over the desired sequence of spring-clip triggers 22.

Figure 2:
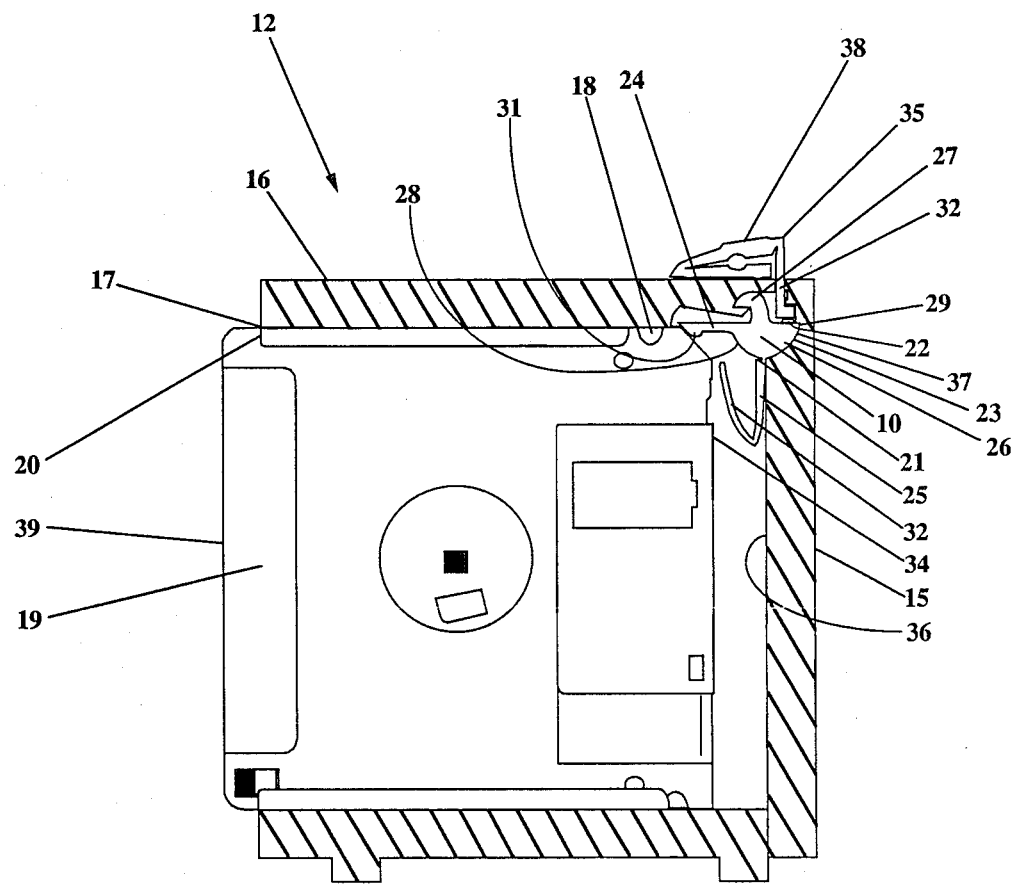
FIG. 2 is a side view of a spring-clip which is about to be engaged by a computer disk.

As seen in FIG. 2, the spring-clip 10 is comprised of a radially arced disk-stop surface 28, a fulcrum/hinge 27 and a generally three-armed member, all formed of a resilient material, such as plastic. A first arm 24, extends radially from the fulcrum/hinge 27 and forward relative to the disk dispenser opening 17, and consists of at least one downwardly projecting retaining latch 31 which may be narrower than the width of arm 24. A second arm 25, shown as a generally V-shaped member 32, extends radially from the fulcrum/hinge 27 downward or away from the selector-button 35 and includes a compressible spring built into a V-shape 32, and a pivot-suppression notch 21 at the base of arm 25 A third arm 26 extends rearward in relation to the disk dispenser opening 17 and includes a rearward pivot/rotation stop 29, a trigger surface 22 and may also include a radially arced surface 23 which rotates within a similarly arced channel 37 provided in the back of disk dispenser 15. In use, a plurality of computer disks 39 may be secured in the disk dispenser and, in this manner, will occupy a minimum of space. As seen in FIG. 2, a disk 19 is inserted into a disk-slot 20 when desired, and as this is done, the retaining latch 31 of arm 24 is lifted by the disk, permitting the spring-clip 10 to rotate radially about the fulcrum/hinge 27. As the inserted disk 19 makes contact with the second arm 25 of spring-clip 10, the spring-action of V-shape 32 is adequately compressed between a contacting surface of disk 34 and an inside portion of the back of disk dispenser 36 until the retaining latch 31 of arm 24 is satisfactorily secured in the disk indent 18. As this is done, the pivot/rotation stop 29 of arm 26 is employed restricting further rearward rotation or displacement of spring-clip 10, while the radially arced disk-stop surface 28 of spring-clip 10 contacts the disk 19 preventing further insertion of the disk.

Figure 3:
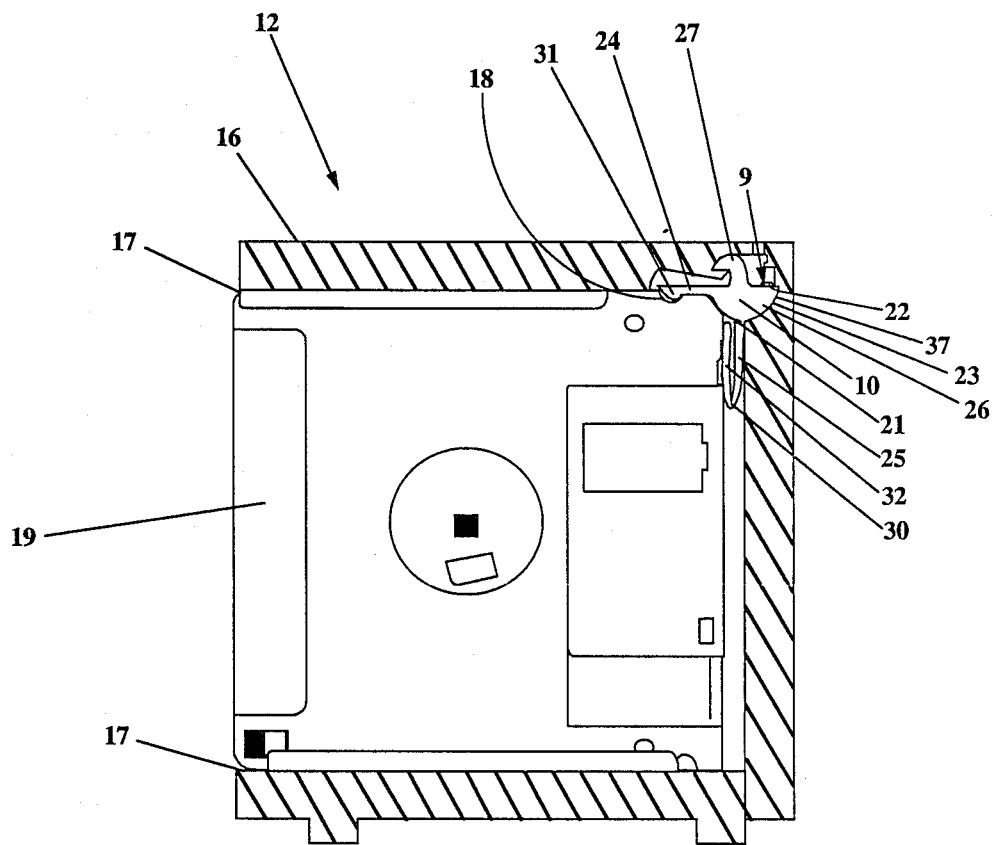
FIG. 3 is a view, similar to that of FIG. 2, showing a computer disk which is about to be disengaged from a spring-clip.
Figure 11:
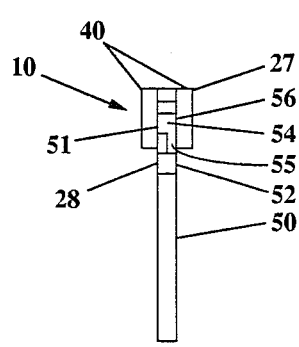
FIG. 11 is a front view similar to that of FIG. 10, showing an alternative form of the spring-clip.
Figure 12:
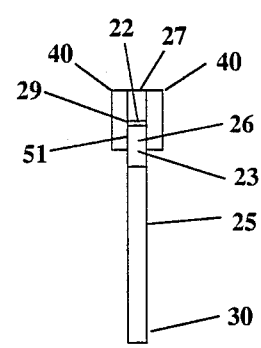
FIG. 12 is a rear view of the spring-clips shown in FIGS 10 and 11.
Figure 13:
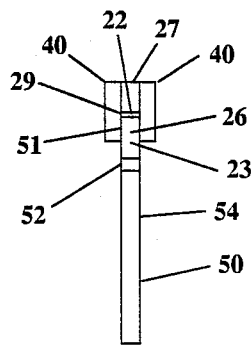
FIG. 13 is a rear view similar to that of FIG. 12 illustrating a separate spring and clip.

Thereafter, as seen in FIG. 3, a computer disk 19 may be dispensed at will by a sufficient pressure 9 being applied to the trigger surface 22 of arc 26 of the spring-clip 10 (see FIGS. 11, 12 & 13). As this is done, the spring-clip rotates radially about the fulcrum/hinge 27 toward the disk 19, and a pivot-suppression notch 21 at the base of arm 25 minimizes the pivot motion of V-shape member 32 and reduces the rotational force needed to overcome the tension of arm 25 and the spring action thereof 30. As the force applied to the spring-clip trigger 22 continues, the spring-clip 10 proceeds to rotate until the retaining latch 31 of arc 24 satisfactorily disengages from an indent 18 in the disk 19, allowing the compressed spring 30 to return to its non-compressed form thereby providing a forward thrusting action sufficient to suitably dispense the disk 19 out of disk dispenser opening 17.

Figure 4:
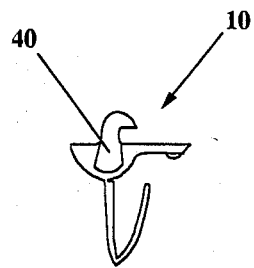
FIG. 4 is a detailed side view of a single spring-clip.

FIG. 4 illustrated an alternative form of the spring-clip. 10 This form of the spring-clip 10 is substantially identical to that of FIGS. 1, 2 and 3 except that an additional thickness of a prescribed area of one or both sides of the spring-clip may be added as a spacer portion 40, for spacing a plurality of spring-clips at the desired distance to one another. This form of the invention is preferred for those instances where a composite structure of multiple spring-clips is not manufactured as one unit. Aside from the addition of a spacer portion 40 to either or both sides of the spring-clip 10, the operation of this form of the spring-clip 10 is identical to that described above with respect to FIGS. 1, 2 and 3.

Figure 5:
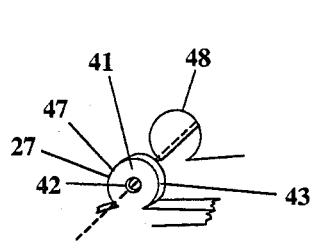
FIG. 5 is an exploded, perspective and partial side view of a spring-clip showing an alternative form of the fulcrum/hinge member of the spring-clip and similarly shaped dispenser channel.

FIG. 5 illustrates an alternative form in the shape and structure of the fulcrum/hinge portion 27 of spring-clip 10 and the fulcrum/hinge channel 45 of the disk dispenser seen in FIGS. 1, 2 and 3. In this form, the fulcrum/hinge may be semi-cylindrical in shape 43 and generally circular in profile 41, permitting hinged rotation about its cylindrical axis in a semi-cylindrical disk dispenser channel 48. A central bore 42 is shown to extend axially through fulcrum/hinge 41 to facilitate quick assembly and alignment of multiple spring-clips. Aside from the shape and structure of the fulcrum/hinge 47 and channel 48, the operation of this form of the spring-clip is identical to that described above with respect to FIGS. 1, 2 and 3.

Figure 6:
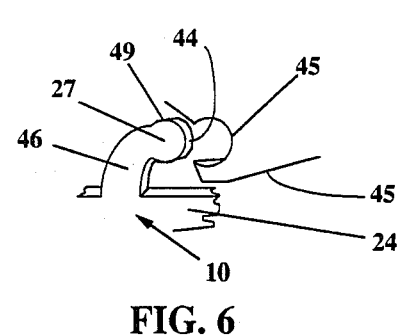
FIG. 6 is an exploded, partial side view, showing a further alternative form of the fulcrum/hinge member of the spring-clip and a corresponding dispenser channel.

FIG. 6 illustrates a further alternative form in the shape and structure of the fulcrum/hinge portion 27 of spring-clip 10 and the fulcrum/hinge channel 45 of the disk dispenser seen in FIGS. 1, 2 and 3. In this form, the fulcrum/hinge is modified with an additional arm member 46 that extends upward radially away from the center of the spring-clip and forward in the direction of arm 24, ending in a fulcrum/hinge which is semi-cylindrical in shape 44, which may be generally circular in profile 49 and rotates about its cylindrical axis in a semi-cylindrical channel of disk dispenser 45 which provides a snap-in fit of each spring-clip when assembled. Aside from the shape and structure of fulcrum/hinge 44 and channel 45, the operation of this form of the spring-clip is identical to that described above with respect to FIGS. 1, 2, 3 and 5.

Figure 7:
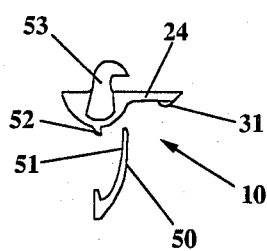
FIG. 7 is a detailed side view showing a spring and clip as separate entities.

FIG. 7 illustrates an alternative form of the spring-clip 10. This form of the spring-clip 10 is substantially identical to that of FIGS. 1, 2 and 3 except that the spring mechanism is formed as a separate entity, as seen at 50 in FIG. 7. This form of the clip with a separate spring 50, is preferred in those instances where simplifying the manufacturing process becomes the priority, such as the manufacturing of two composite structures of multiple clips and springs. Referring to FIG. 7, as each disk is inserted it contacts and compresses a spring 50 until contact of the rear portion of spring 51 is made with a lever 52 which in turn causes an arm 24 to pivot and its retaining latch 31 to descend and secure a disk. Aside from the separation of clip 53 and the spring 50 into two entities, the operation of this form of the clip portion 53 is identical to that described above with respect to FIGS. 1, 2 and 3.

Figure 8:
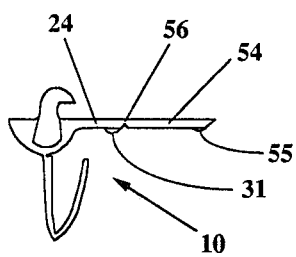
FIG. 8 is a view, similar to that of FIG. 4, showing an alternative form of the spring-clip of FIG. 4.

FIG. 8 illustrates a further alternative form of the spring-clip 10. This form of spring-clip 10 is substantially identical to that of FIGS. 1, 2 and 3 except that an extended arm 54 and auxiliary retaining latch 55 has been added onto spring-clip arm 24 at a flexible joint 56. An auxiliary retaining latch 55 provides suitable retention of an inbound or outbound disk by employing the same disk indent 18 which latch 31 employs. This allows for a desired secondary, or temporary positioning of the disk, extending it a convenient distance out from the opening of the disk dispenser. The auxiliary retaining latch 55 is more rounded than the latch 31, and the extended arm 54 is less rigid than arm 24, therefore, the disks which are held in place by latch 55 are not locked into a position as they are with latch 31, and may be easily engaged or disengaged by pushing in or pulling out the disk with one's fingers. Aside from the addition of an extended arm 54, a flexible joint 56 and auxiliary latch 55, the operation of this form of the spring-clip 10 is identical to that described above with respect to FIGS. 1, 2 and 3.

Figure 9:
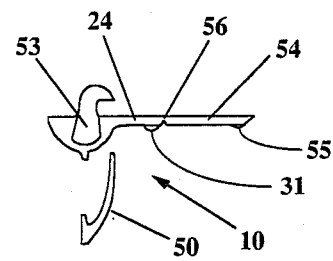
FIG. 9 is a view, similar to that of FIG. 7, showing an alternative form of the spring and clip of FIG. 7.

FIG. 9 illustrates a further alternative form of the spring-clip 10. This form of spring-clip 10 is substantially identical to that of FIG. 8 except that the spring mechanism is formed as a separate entity, as seen at 50 in FIG. 9. Aside from the separation of the clip 53 and the spring 50 into two entities, the operation of this form of clip portion 53 is identical to that described above with respect to FIGS. 1, 2, 3 and 8, and the operation of this form of the spring portion 50 is identical to that described above with respect to FIG. 7.

Figure 10:
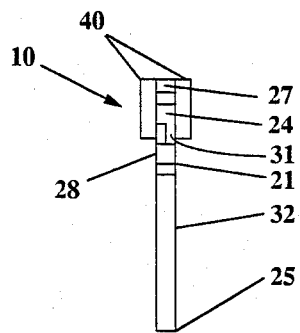
FIG. 10 is a front view of a spring-clip which comprises a portion of the FIG. 1 disk dispenser.

As best seen in FIG. 10, the forward facing surfaces of spring-clip 10 with respect to the disk dispenser opening, include a spring mechanism 32 attached to arm member 25 joined to the clip body 51 at notch 21 just below disk-stop 28 beneath arm 24 which extends forward to include retaining latch 31 both of which extend forward from clip body 51 onto which fulcrum/hinge 27 and optional spring-clip spacers 40 are also attached.

FIG. 11 shows a similar view to that of FIG. 10 while illustrating an alternative form of a spring 50 which is shown as separate from but interacts with clip body 51 at lever 52. Also shown is an additional arm 54 and auxiliary latch 55 both of which project forward from a flexible joint 56 extending from arm 24 as can also be seen in FIG. 8.

FIG. 12 illustrates a view of the rearward facing surfaces of the spring-clip described in FIG. 10 including spring surface 30 attached to ar member 25 joined to the clip body 51 just below rearwardly projecting arm 26 which extends upward and rearward to include pivot/rotation stop 29, spring-clip trigger 22 and which may include an optional radially arced surface 23 between stop 29 and arm 25. As can also be seen in FIGS. 1, 2 and 3, radial arc 23, stop 29, and trigger 22 extend rearwardly and upwardly from clip body 51 onto which fulcrum/hinge 27 and optional spring-clip spacers 40 are also attached.

FIG. 13 illustrates a view of the rearward facing surfaces of the clip and spring described in FIG. 11, including a spring 50 and spring surface 54 which are separate from but interact with clip body 51 at lever 52.

Figure 14:
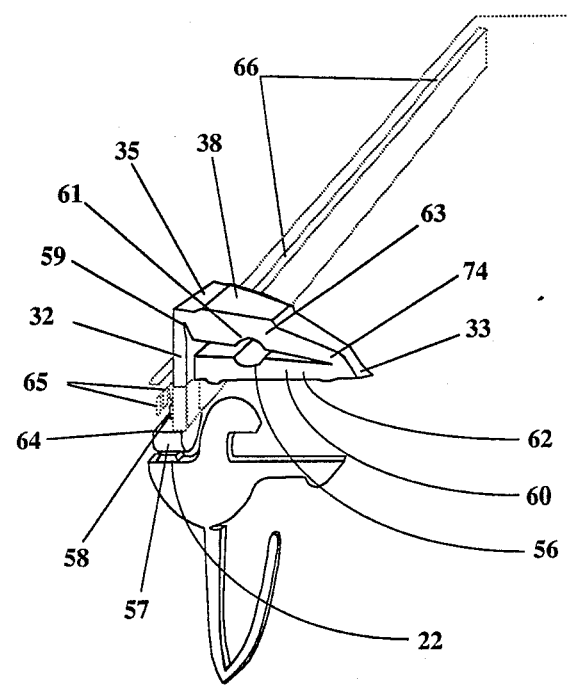
FIG. 14 is a perspective view of the selector-button of FIG. 1 which comprises a portion of the FIG. 1 disk dispenser.

FIG. 14 illustrates a selector-button interacting with a spring-clip. In a perspective view of FIG. 14, the selector-button 35 is shown being comprised of a lower portion 62, a base 60 with a lower lock insertion channel 56, a resilient joint 74, an index pointer./indicator 33, at least one flex-enhancing groove 59, an upper portion 63, a button surface 38, an upper lock insertion channel 61, an actuator-arm 32 with an actuator-arm catch 64 and trigger contacting surface 57 which slides in slot 66 and is retained in slot 66 by the actuator-arm catch 64, and a selector-button positioning detent 58 which frictionally aligns the selector-button among a series of shallow indents 65 each of which is aligned to one corresponding disk-slot and spring-clip. The selector-button 35 is constructed out of a resilient material, such as plastic, which permits upper portion 63 to easily be compressed toward lower portion 62 when suitable pressure is applied to button surface 38, this in turn causes the trigger contacting surface 57 of actuator-arm 32 to contact the spring-clip trigger 22 and thereby dispense an intended computer disk. Alternatively, any sequence of spring-clips may be triggered by depressing button surface 38 while sliding the selector-button 35 in slot 66 at the same time.

Figure 15:
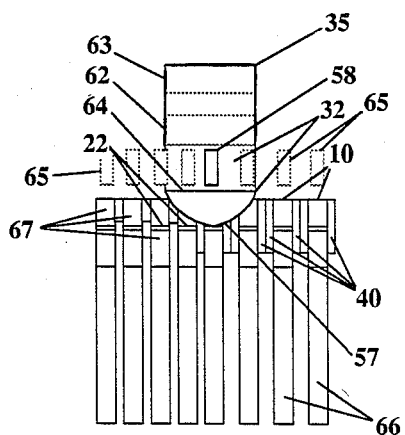
FIG. 15 is a rear view of the selector-button and spring-clips shown in FIG. 10.

FIG. 15 illustrates a selector-button 35 interacting with spring-clip 10 showing the back portions of both the selector-button and spring-clips. As seen from this view, the selector-button 35 is shown with of an actuator-arm 32, an upper portion 63 and lower portion 62 both shown in dashed lines, a trigger contacting surface 57, an actuator-arm catch 64 and a selector-button positioning detent 58 which interacts with shallow indents 65 shown in dotted lines, each of which has one corresponding disk-slot and spring-clip respectively. Also shown is a small group of individual spring-clips 66 including the spacers 40 of these clips. An alternative example illustrates part of a composite of spring-clips 67.

Figure 16:
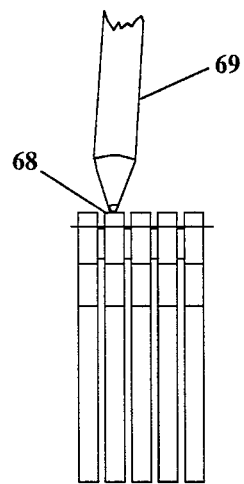
FIG. 16 is a view similar to that of FIG. 15, showing an alternative means for triggering the spring-clips.
Figure 17:
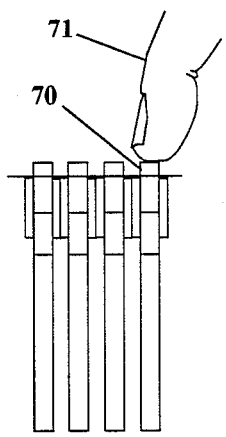
FIG. 17 is a view similar to that of FIG. 16, showing a further alternative means for triggering the spring-clips.

FIGS. 16 and 17 show alternative forms of the spring-clip triggers. In one form, the spring-clip 68 is shown being activated with an external implement, such as an ordinary ballpoint pen 69. In the other form, spring-clip 70 is shown being activated by an external implement such as a human finger 71.

Figure 18:
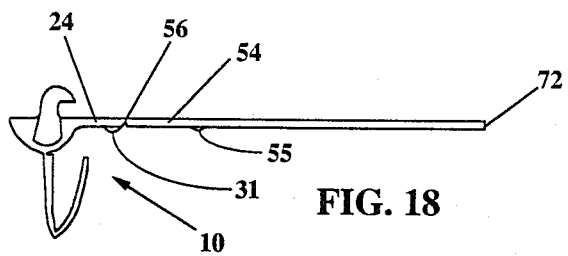
FIG. 18 is a view similar to that of FIG. 8, showing an alternative means for triggering the spring-clips.

FIG. 18 illustrates a further alternative form of spring-clip trigger. In this form, a front trigger extension 72 is added to the length of 54 (FIG. 8) to be activated at the front of the disk dispenser.

Figure 19:
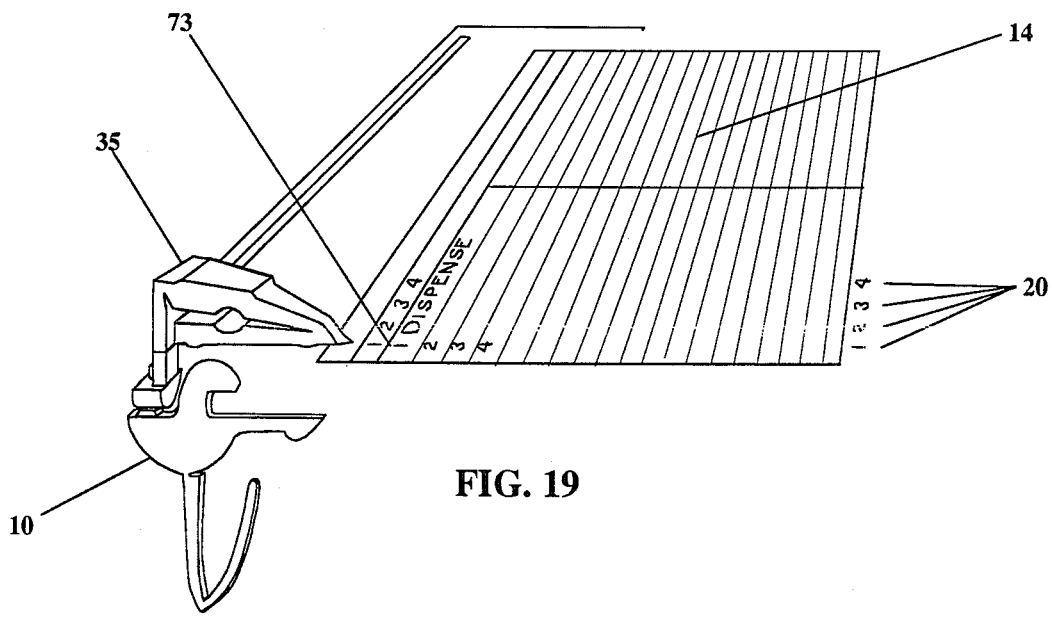
FIG. 19 is a view similar to that of FIG. 14 showing a standard locking device inserted into a selector-button.

FIG. 19 illustrates a selector-button 35 pointing to an index number/title 73 of label index 14 while activating a corresponding spring-clip 10 in a same numbered disk-slot 20, dispensing the same numbered/titled disk from the disk dispenser opening 17.

Figure 20:
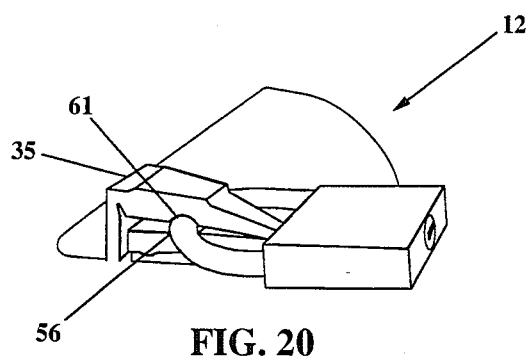
FIG. 20 is a perspective view of a disk dispenser with a locking device.

FIG. 20 shows a perspective view of a disk dispenser 16 with a locking device, such as a standard padlock, inserted through either the upper portion 63 and lower portion 62 of the selector-button 35, or the upper lock insertion channel 61 and the lower lock insertion channel 56 of the selector-button 35, prohibiting the depression of the selector-button, which in turn prohibits the dispensing of disks while said locking device is in place.

Obviously, numerous variations and modifications may be made without departing from the spirit of the present invention. Therefore, it should be clearly understood that the forms of the present invention described above and shown in the accompanying drawings are illustrative only and are not intended to limit the scope of the present invention.

What is claimed is:

1. A storage container and dispenser of computer disks and the like comprising:
a plurality of locking-lever spring mechanisms, herein referred to as spring-clips, which secure said computer disks in, and dispense them from said container in an organizing fashion and are formed out of a resilient material, such as plastic, and
function independent of one another, each of which includes a fulcrum/hinge which securely pivots in a fulcrum/hinge channel, and
said spring-clips are otherwise generally shaped as three-armed members, on one arm is the disk retaining means, on a second arm is a forward thrusting spring-action, on a third arm is a trigger, and
these spring-clips are positioned in the container in an equal number of disk-slots, in such a way as to provide convenient access to the spring-clip triggers.

2. The spring-clips of claim 1 wherein:
said pivoting fulcrum/hinge, said disk retaining means, and said trigger portion are formed as a single unit and are separate from the forward thrusting spring-action.

3. The spring-clips of claim 1 wherein:
an additional thickness of a prescribed area of one or both sides of the spring-clip is added as a spacer portion, for spacing a plurality of spring-clips at a desired distance to one another.

4. The spring-clips of claim 1 further comprising:
said disk retaining latch having an elongated member attached thereto at a flexible joint and onto which member is mounted an auxiliary disk retaining latch.

5. The elongated member of claim 4 wherein:
said member is extended to the front of the disk container to provide an alternate spring-clip trigger which can be activated around the front of said container.

6. The container of claim 1 further comprising:
a positionably slideable selector-button constructed out of a resilient material, such as plastic, which operates in a slotted opening formed in said container in such a way as to activate (1.) any single spring-clip, or (2.) any sequence of spring-clips, depending respectively on whether (1.) the selector-button is depressed while in a single position, or (2.) if it is slid and depressed at the same time and said selector-button consists an index pointer/indicator from which extends a flexing upper portion having a button surface and an actuator-arm that may slide from side to side and/or up and down in said slot, and is retained in said slot by an actuator-arm catch, below which is formed a spring-clip trigger contacting surface.

7. The selector-button of claim 6 wherein:
a lower and upper portion of said selector-button are attached at a flexible joint and a lock insertion channel or gap is provided in or between these portions permitting a locking device, such as a standard padlock to be inserted therethrough, so as to prevent the depression of the selector-button and the dispensing of stored disks while said lock is in place.

8. The selector-button of claim 6 wherein:
a selector-button positioning indent or detent is formed on said actuator arm to frictionally position the selector-button among any one in a series of conversely opposed detents or indents which are positioned in such a way as to align the index pointer/indicator portion of the selector-button to an index while the trigger contacting surface of the selector-button is aligned to a corresponding spring-clip.

9. The spring-clips of claim 1 wherein:
a central bore is formed in said spring-clips to facilitate quick assembly and alignment of a plurality of spring-clips.

10. The spring-clips of claim 1 wherein:
a plurality of spring-clips are formed into a composite unit, joined to one another at a minimal cross-section of each fulcrum/hinge in such a way as to be aligned with a plurality of disk-slots while maintaining the necessary pivoting and spring-action motion required of each spring-clip in the composite.

11. The spring-clips of claim 1 wherein:
a plurality o triggerably hinged clips are formed into one composite unit, and a plurality of spring-actions are formed into a separate composite unit, where each clip is joined to another at a minimal cross-section of each fulcrum/hinge, and each spring-action is also joined to a minimal cross-section of its adjacent spring, where both of the composite units operate in such a way as to be aligned with a plurality of disk-slots while maintaining the necessary pivoting motion required of each clip and the necessary spring motion required of each spring.

* * * * *